Aug. 7, 1951 L. L. LAKATOS 2,562,986

RADIO DIRECTION FINDER

Filed March 28, 1946

INVENTOR.
Louis L. Lakatos
BY
[signature]
ATTORNEY

Patented Aug. 7, 1951 2,562,986

UNITED STATES PATENT OFFICE 2,562,986

RADIO DIRECTION FINDER

Louis L. Lakatos, Bale Cynwyd, Pa., assignor to Radio Corporation of America, a corporation of Delaware Application March 28, 1946, Serial No. 657,687

7 Claims. (Cl. 343—117)

This invention relates to improvements in self orienting radio direction finders, and has for its principal object the provision of methods of and means for automatic direction finding which do not require audio frequency modulation of commutation of the received signals.

Another object of the present invention is to avoid the usual requirement of 90 degree phase shifting means for sensing in a radio direction finder.

A further object of this invention is to provide self orienting direction finder systems which are simple and reliable in operation, involving no critical phase or amplitude relations which must be maintained for accurate indication.

Figure 1:
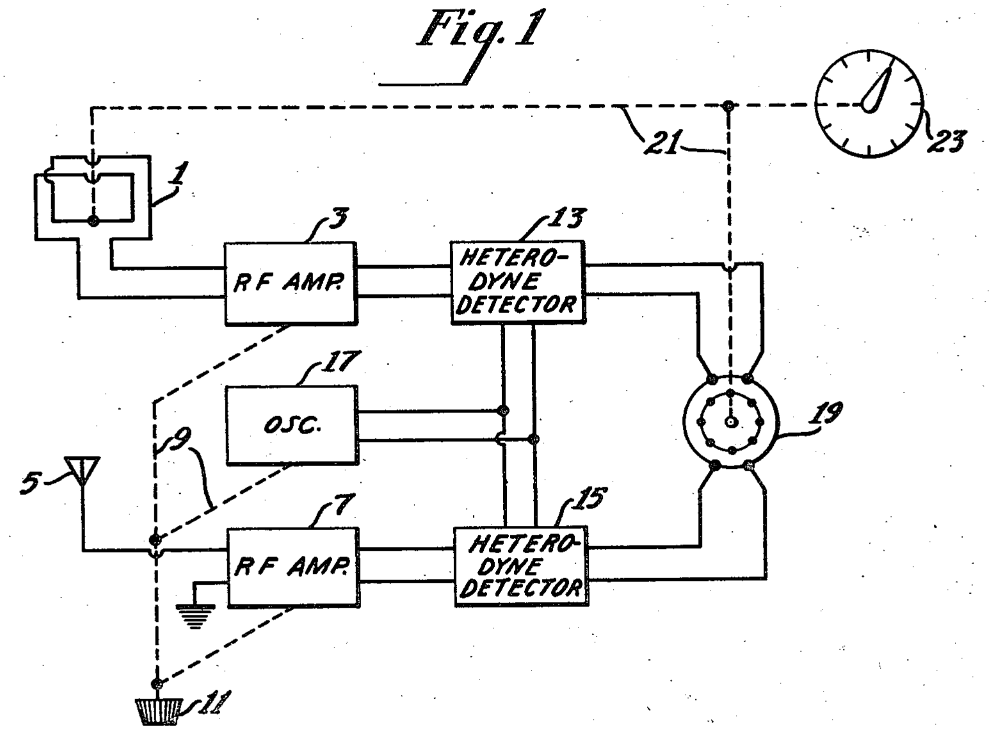
Figure 2:
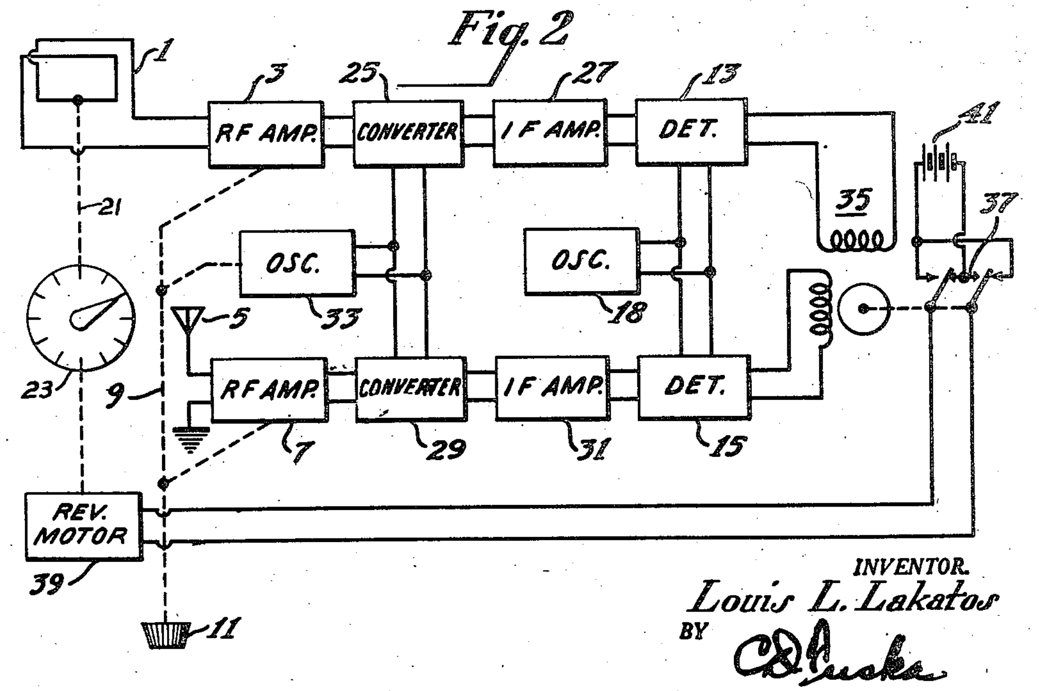

The foregoing objects will become apparent to those skilled in the art upon consideration of the following description, with references to the accompanying drawing, wherein:

Figure 1 is a schematic diagram of a self orienting direction finder embodying the instant invention, and Figure 2 is a schematic diagram of a modification of the system of Figure 1.

Referring to Figure 1, a rotatable loop antenna 1 is connected to a radio frequency amplifier 3. A substantially non-directive sense antenna 5 is connected to a similar amplifier 7. The amplifiers 3 and 7, together with their associated antennas, are tunable over a range of frequencies. Their tuning controls are ganged, as indicated by the dash lines 9, for operation by a common control knob 11.

The output circuit of the amplifier 3 is connected to a heterodyne detector 13, which may be of the type used for frequency conversion in ordinary superheterodyne radio receivers, or any other device providing an output of a frequency equal to the difference in frequency of two input signals. The amplifier 7 is similarly connected to a heterodyne detector 15.

A variable frequency oscillator 17 is connected to both detectors 13 and 15. The frequency of the oscillator 17 is controlled by the common tuning control 11. The arrangement is such that the frequency of the oscillator 17 always differs from that to which the amplifiers 3 and 7 are tuned by substantially constant amount, preferably of the order of a few hundred cycles per second.

The output of the detector 13 is applied to one phase input of a two phase induction motor 19. The detector 15 is similarly connected to the other phase input of the motor 19. The output shaft of the motor 19 is mechanically coupled to the loop antenna 1, as indicated by the dash lines 21. Also coupled to the motor 19 is a bearing indicator 23, comprising a pointer and a scale calibrated in angular measure, like a 360 degree protractor.

The operation of the system of Figure 1 is as follows:

The tuning control 11 is adjusted to tune the amplilers 3 and 7 to the frequency of the radio transmitter whose direction is to be indicated. This adjusts the oscillator to a frequency which is, for example, 200 cycles per second higher than the received signal.

The radio frequency carriers of the signals provided by the antennas 1 and 5 are always exactly 90 degrees out of phase, because the voltages induced in the two sides of the loop subtract vectorially, producing a resultant which is 90 degrees out of phase with the electric component of the radiation field, while the non-directive antenna responds directly to said component. This phase relationship is substantially maintained by the signals in passing through the amplifiers 3 and 7.

The detectors 13 and 15 each provide an output including a component whose frequency is the difference between the carrier frequency and the oscillator frequency: in the present illustration, about 200 cycles per second. These output components, like the corresponding inputs from the amplifiers 3 and 7, are 90 degrees out of phase. That from the detector 13 may lead or lag that from the detector 15, depending upon whether the axis of minimum response of the loop 1 is to one side or the other of the line of signal arrival.

The motor 19 will run in one direction or the other, depending upon which of its two inputs leads the other. The connections are made so that it drives the loop 1 to bring its axis of minimum response to bear on the transmitter. When the loop reaches this position, its output decreases substantially to zero, and the corresponding phase of the motor 19 is deenergized, stopping the motor. Any subsequent change in the direction of signal arrival or in the position of the loop will cause the motor 19 to run again, thus maintaining the loop substantially continuously in the position of minimum response. The indicator 23, being coupled to the motor and loop, will indicate continuously the direction of the transmitter.

It has been assumed that any phase shifts occurring in the amplifiers 3 and 7 are equal. While this condition may be obtained, since the two amplifiers are identical, a considerable difference in phase shift can be tolerated, because the motor 19 will operate properly even if its two inputs are not exactly 90 degrees out of phase. The only effect will be to reduce the over-all sensitivity of the system. The same comment applies to unequal gains in the amplifiers 3 and 7.

Likewise it has been assumed that the frequency of the oscillator 17 differs from that of the carrier by a constant amount. Imperfect tracking of the tuning controls will cause this difference to vary with operation of the tuning control 11, varying the frequency of the inputs to the motor 19. However, it will not change their phase relationship. Since two phase motors may be designed to operate efficiently over a fairly wide range of frequencies, variation in tracking or frequency drift of the oscillator 17 have substantially no effect on the operation of the described system.

It will be apparent that the amplifiers 3 and 7 may be omitted, and the antennas 1 and 5 connected directly to the detectors 13 and 15. Also, the system may be used as a radio compass of the L-R indicator type by disconnecting the motor 19 from the loop and using it to drive a course deviation indicator. One of the advantages of the present system over those of the prior art is its adaptability for communication reception. Since neither the loop nor the open antenna circuit is modulated, either may be used for reception of audi-modulated signals while the direction finder is operating. This may be accomplished by connecting a detector and audio system in either channel, ahead of the heterodyne detector 13 or 15.

Referring to Figure 2, the present invention is embodied in a superheterodyne type direction finder. Elements in Figure 2 which correspond to those of Figure 1 are designated by similar reference numerals. The radio frequency amplifier 3 is connected to a frequency convertor or first detector 25, whose output goes through an intermediate frequency amplifier 27 to the heterodyne detector 13. The amplifier 7 is similarly connected to a convertor 29, intermediate frequency amplifier 31, and the heterodyne detector 15.

A common oscillator 33 is provided for the two channels. Like the oscillator 17 of Figure 1, it is tunable with the amplifiers 3 and 7, but the difference frequency in this case is much higher, for example 200 kilocycles per second. The tuning of both intermediate frequency amplifiers is fixed at this frequency. The oscillator 17 of Figure 1 is replaced in Figure 2 by an oscillator 18 whose tuning is fixed at, for example 200,200 cycles per second.

The outputs of the detectors 13 and 15 are connected to a two phase relay device 35, which may be similar or identical in construction with the two phase motor 19 of Figure 1. The relay 35 is provided with a set of contacts 37, connected as a reversing switch between a motor 39 and a power source 41. The motor 39 is coupled, as indicated by the dash line 21, to the bearing indicator 23 and the loop 1.

In the operation of the system of Figure 2, each channel including the radio frequency amplifier, convertor and intermediate frequency amplifier operates like a conventional superheterodyne receiver. The oscillator 33 supplies both convertors 25 and 29, so the intermediate frequency signals are exactly equal in frequency. The detectors 13 and 15, as in the system of Figure 1, provide low frequency two phase output. Whenever the loop null is not in line with the direction of signal arrival, the relay 35 is actuated to energize the motor 39, rotating the loop. Thus, as in the system of Figure 1, the loop is positioned substantially continuously and the indicator 23 shows the direction of the transmitter.

The invention has been described as an improved radio direction finder system, wherein signals are received on a directive antenna and a non-directive antenna respectively. The 90 degree phase relationship of said signals is taken advantage of to drive a two phase motor. This avoids the requirement, usual in prior art direction finders, of a 90 degree phase shifter in the sensing circuit, and at the same time provides two phase energization for the motor without a phase splitter. Since no critical phase or amplitude conditions need be maintained, the described system is conveniently operable over a wide band of signal frequencies.

I claim as my invention:

1. In a radio direction finder system including a rotatable directive antenna and a sense antenna providing respective signals, means for rotating said directive antenna including a two phase induction motor, means for converting both of said signals to respective signals of lower frequency and having substantially the same phase relationship as said first mentioned signals, and means for applying said converted signals to respective phases of said induction motor.

2. In a radio direction finder system including a directive antenna and a sense antenna providing respective signals having a phase relationship of nearly 90 degrees, direction indicator means including a two phase induction motor, means for converting both of said signals to respective signals of lower frequency and having substantially the same phase relationship as said first mentioned signals, and means for applying said converted signals to respective phases of said induction motor.

3. A self orienting radio direction finder system including a rotatable directive antenna, means for rotating said antenna including a two phase induction motor, a sense antenna, means for energizing one phase of said motor in response to signals derived from said sense antenna, and means for energizing the other phase of said motor in response to signals derived from said directive antenna.

4. A radio direction finder system including a directive antenna, indicator means including a two phase induction motor, a sense antenna, said directive and sense antennas being arranged to provide respective signals having a phase relationship of nearly 90 degrees, means for energizing one phase of said motor in response to signals derived from said sense antenna, and means for energizing the other phase of said motor in response to signals derived from said directive antenna.

5. A self orienting radio direction finder system including antenna means providing two signals in substantially quadrature phase with each other, said antenna means including at least one rotatable directive element, two-phase induction motor means coupled to said rotative directive element to adjust the direction of minimum response thereof, said motor means including two input circuits, and means for applying said signals respectively to said input circuits, whereby said motor is energized to cause rotation of said directive element to a position of minimum response.

6. A self orienting radio direction finder system including a substantially non-directive antenna and a rotatable directive antenna; two heterodyne detectors and means for applying the outputs of said antennas respectively to said detectors, a common oscillator coupled to both of said detectors, a two-phase motor with two input circuits, means for applying the outputs of said detectors to said input circuits respectively, and means coupling said motor to said directive antenna to cause rotation of said directive antenna upon rotation of said motor.

7. A radio direction finder system including a substantially non-directive antenna and a directive antenna arranged to provide respective signals having a phase relationship of nearly 90 degrees; two heterodyne detectors and means for applying the outputs of said antennas respectively to said detectors, a common oscillator coupled to both of said detectors, a two-phase motor with two input circuits, means for applying the outputs of said detectors to said input circuits respectively, and direction indicator means coupled to said motor.

LOUIS L. LAKATOS.

REFERENCES CITED

The following references are of record in the file of this patent:

UNITED STATES PATENTS

| Number | Name | Date |
|---|---|---|
| 2,202,400 | Roberts | May 28, 1940 |
| 2,208,733 | Roberts | July 23, 1940 |
| 2,282,402 | Hefele | May 12, 1942 |
| 2,284,509 | Boes et al. | May 26, 1942 |
| 2,329,199 | Hefele | Sept. 14, 1943 |
| 2,412,612 | Godet | Dec. 17, 1946 |